US007904474B2

(12) United States Patent
Rowley

(10) Patent No.: US 7,904,474 B2
(45) Date of Patent: Mar. 8, 2011

(54) ENTRY BASED ACCESS CONTROL CACHE

(75) Inventor: Peter A. Rowley, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 229 days.

(21) Appl. No.: 11/607,741

(22) Filed: Nov. 30, 2006

(65) Prior Publication Data

US 2008/0133481 A1 Jun. 5, 2008

(51) Int. Cl.
*G06F 17/30* (2006.01)

(52) U.S. Cl. ........................................ 707/781; 707/786

(58) Field of Classification Search .................. 707/781, 707/786

See application file for complete search history.

(56) References Cited

U.S. PATENT DOCUMENTS 6,366,913 B1 * 4/2002 Fitler et al. .................... 709/203
6,438,550 B1 * 8/2002 Doyle et al. ...................... 726/2
6,601,065 B1 * 7/2003 Nelson et al. ................. 707/781
6,778,991 B2 * 8/2004 Tenorio ......................... 707/740
6,823,328 B2 * 11/2004 Schreiber ....................... 707/770
6,917,944 B1 * 7/2005 Prasad et al. .................. 707/781
6,944,626 B2 * 9/2005 Cameron et al. .............. 707/786
6,947,940 B2 * 9/2005 Anderson et al. ............. 707/613
2003/0055991 A1 * 3/2003 Krishnapuram et al. ..... 709/229
2007/0136350 A1 * 6/2007 Arndt ........................... 707/102
2008/0059427 A1 * 3/2008 Kinder et al. ..................... 707/3
2008/0126295 A1 * 5/2008 Rowley ............................. 707/1

* cited by examiner

*Primary Examiner* — Don Wong
*Assistant Examiner* — Kim T Nguyen
(74) *Attorney, Agent, or Firm* — Blakely, Sokoloff, Taylor & Zafman LLP

(57) ABSTRACT

A method and apparatus for retrieving data from a Lightweight Directory Access Protocol (LDAP) repository. In one embodiment, the method includes retrieving a list of lightweight directory access protocol (LDAP) access control instructions (ACIs) for an LDAP entry, and storing the list in a cache of an LDAP server as an entry associated with the LDAP entry.

22 Claims, 6 Drawing Sheets

ENTRY BASED ACCESS CONTROL CACHE

TECHNICAL FIELD

Embodiments of the present invention relate to servicing requests for data using a Lightweight Directory Access Protocol (LDAP), and more specifically to creating an attribute for each entry in the LDAP repository that includes all of the applicable access control instructions.

BACKGROUND

The Light Weight Directory Access Protocol (LDAP) has become very popular due to its efficient and fast data access. A large number of applications/services are currently in use and being developed which use an LDAP directory as their centralized data repository.

The LDAP directory stores entries as a tree. Each entry may consist of one or more attribute names and attribute values. An entry may be uniquely identified by its distinguished name (DN) that may include a common name (cn) attribute of the entry and DN of a parent entry.

The contents of the entries are governed by an LDAP directory schema. The schema defines object classes and each entry has an objectClass attribute containing named classes defined in the schema. The objectClass attribute may be multivalued and contain the class "top" as well as some number of other classes. The schema definition for each class an entry belongs to defines what kind of object the entry may represent (e.g., a person, organization or domain). Membership in a particular class gives the entry the option of containing one set of attributes (optional attributes), and the obligation of containing another set of attributes (mandatory or required attributes). For example, an entry representing a person might belong to the class "person." Membership in the "person" class would require the entry to contain the "sn" and "cn" attributes and allow the entry also to contain "userPassword," "telephoneNumber" and other attributes.

Each LDAP entry may have a set of applicable access control instructions (ACIs). These ACIs determine which users have access to the attributes and attribute values of an entry and the type of access allowed to each user. The entries in the LDAP repository and schema are typically organized in a hierarchical tree type data structure. Each entry also inherits the ACIs of its parent entries. In order to evaluate the ability of a user to access an entry, the tree must be traversed to determine the applicable ACIs that the entry inherits.

BRIEF DESCRIPTION OF THE DRAWINGS

The present invention is illustrated by way of example and not by way of limitation, in the figures of the accompanying drawings.

DETAILED DESCRIPTION

Figure 1:
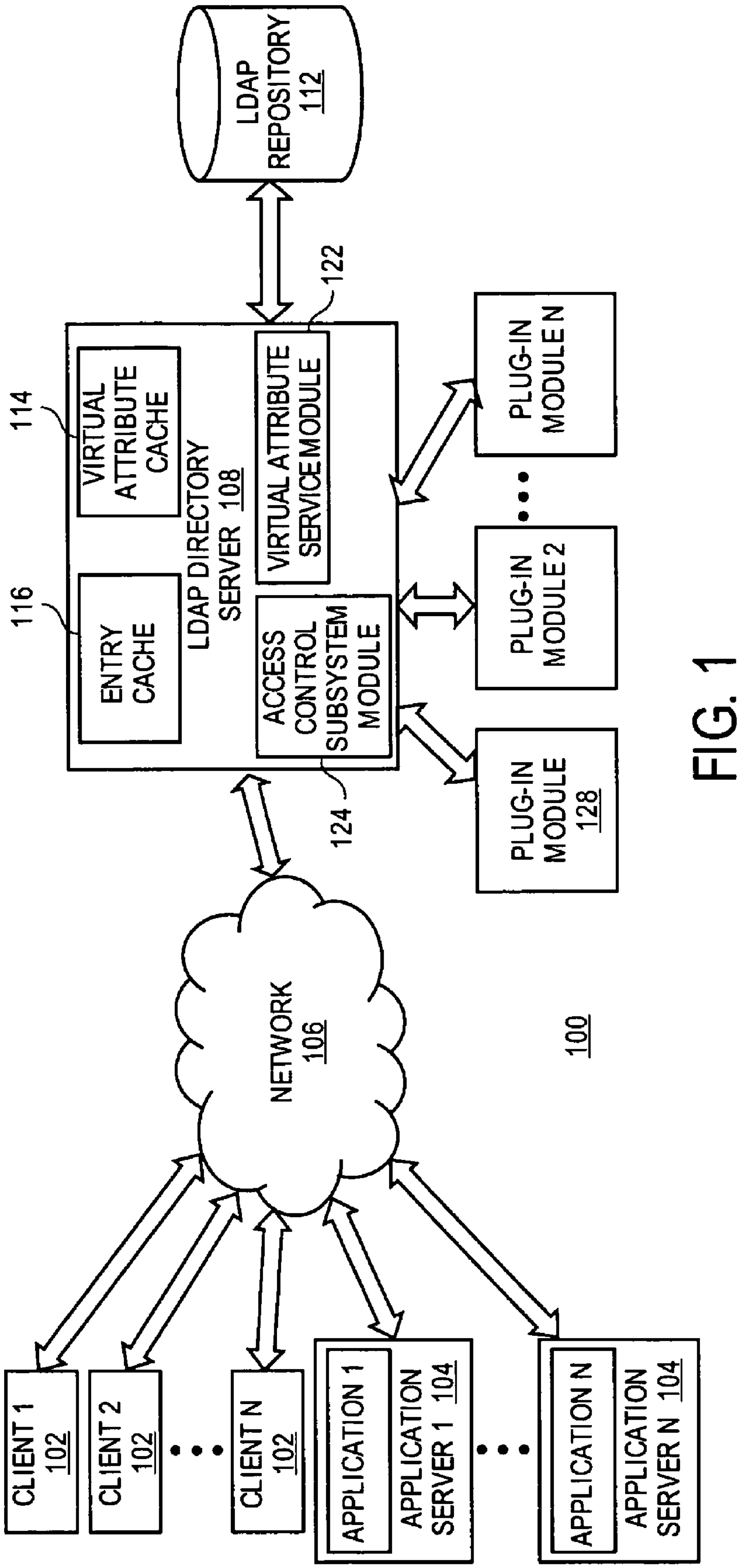
FIG. 1 is a diagram of one embodiment of a network and system including an lightweight directory access protocol (LDAP) server.

Embodiments of the present invention provide enhanced Lightweight Directory Access Protocol (LDAP) entry data to improve performance of access control within an LDAP server. Each LDAP entry may have an attribute or virtual attribute whose value or values define all access controls that apply to the entry. This allows the LDAP server and its access control subsystem to determine access to each entry without having to traverse the LDAP directory tree to determine the applicable access controls such as inherited access controls. The access control attribute or virtual attribute may have values including all applicable access control instructions for that LDAP entry. The method and apparatus also include maintaining a cache of the access control attributes or virtual attributes and handling modifications including add and delete operations for access control instructions.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying" or the like, refer to the action and processes of a computer system or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"), random access memory ("RAM"), magnetic disk storage media, optical storage media, flash memory devices or other type of machine-accessible storage media.

FIG. 1 is a diagram of one embodiment of a network architecture 100 in which embodiments of the present invention may operate. The network architecture 100 may include client devices (clients) 102, an LDAP directory server 108 and a network 106. The clients 102 may be, for example, personal computers (PCs), mobile phones, palm-sized computing devices, personal digital assistants (PDAs) or similar devices capable of communicating over the network 106 and running an LDAP client.

The clients 102 are coupled to the LDAP directory server 108 via the network 106, which may be a public network (e.g., Internet) or a private network (e.g., a virtual local area network (VLAN)). The LDAP directory server 108 may contain a server front-end responsible for network communications, plugins 128 or modules for server functions (such as access control and replication), a basic directory tree containing server-related data and a database back-end plugin responsible for managing the storage and retrieval of LDAP repository data.

In one embodiment, the clients 102 communicate with the LDAP directory server 108 via a web server (not shown). For example, the clients 102 may execute web browsers that communicate with the web server using HTTP to request information. The web server may then communicate with the LDAP directory server 108 using LDAP to retrieve requested information from an LDAP repository 112. Alternatively, the clients 102 may communicate directly with the LDAP directory server 108 using LDAP to request information stored in the LDAP repository 112.

The network architecture 100 may also include one or more application servers 104 that hosts various applications requesting information from the LDAP directory server 108. The application servers 104 operate as clients in communications with the LDAP directory server 112. Similar to the clients 102, the application servers 104 may communicate with the LDAP directory server 112 directly or via a web server.

The LDAP repository 112 may be part of the LDAP directory server 108 or it may reside externally (e.g., on a database server). The LDAP repository 112 may contain a tree of data entries. The structure of the entries may be specified in the definition of the LDAP repository 112. The definition of the LDAP repository 112 may be represented as a schema, a table or some other data structure and may reside independently or inside the LDAP repository 112. For example, the schema may be included in the LDAP repository 112 as a collection of LDAP repository entries rooted at the base DN cn=schema.

The schema may define object classes and attributes associated with each object class. Each entry in the LDAP repository has an objectClass attribute, containing one or more classes defined in the schema. The schema definition for each class that an entry belongs to defines what kind of object the entry may represent (e.g., a person, organization or domain).

In one embodiment, the LDAP server 108 may include a cache and an index 114. The cache may store entry and attribute data recently retrieved from the LDAP repository 112. The cache is utilized to improve the performance of the LDAP server 108 by providing fast access to the data in the cache that is stored in a local memory or similar storage device with a quick access time or low latency instead of retrieving the data from the LDAP repository 112, which is typically an external database stored on a set of magnetics disks, such as a fixed disk or array of fixed disks that are slower than the cache.

The LDAP server 108 may maintain an index or set of indices. The index also improves server performance because it is stored in local memory with fast access or low latency and allows the LDAP server 108 to locate frequently accessed entries and attributes without having to search the LDAP repository 112. The entries in the index may be set by a system administrator, may have default settings or may be similarly maintained. The entries in the LDAP index may include entry IDs and targets to be used by the LDAP server 108 when evaluating filter search terms and similar LDAP operations. The entry IDs may be matched with the search terms and the corresponding targets may be retrieved.

In one embodiment, the LDAP directory server 108 may maintain an entry cache 116, which contains recently retrieved entries including attributes and attribute values of each entry. In another embodiment, the cache may store individual attributes. Entries in the entry cache 116 may be replaced when the cache is full and a new entry is to be added according to a replacement scheme such as by selecting the least recently used (LRU) entries for replacement or using similar replacement schemes. If a request for an entry is received by the LDAP server 108, the LDAP server may check for the requested entry in the entry cache 116 before retrieving it from the LDAP repository 112. The entry cache 116 is a faster or lower latency memory or storage device than the LDAP repository 112, thereby improving system performance when entries are retrieved from the entry cache 116 instead of the LDAP repository 112.

In one embodiment, the LDAP server 108 may also include a virtual attribute cache 120. A virtual attribute is an attribute of an entry that is typically not stored in the LDAP repository 112. A virtual attribute may instead be dynamically generated, determined or derived from other entry or attribute data or from any algorithm or program when the data is needed. Virtual attributes may be treated in the same manner as standard attributes by clients 102. The LDAP server 108 determines which attributes are virtual and facilitates the management of the virtual attributes. In one embodiment, virtual attributes may be generated by plugin modules 128, which may be referred to as virtual attribute providers. For example, a plugin module may track the online status of a user from an instant messaging program. This status may be tracked as a virtual attribute associated with an entry for each user. The determination or management of the virtual attributes may be handled by a virtual attribute service module 122. The virtual attribute service module 122 may handle requests for data from the clients which do not distinguish between virtual and standard attributes by identifying requested virtual attributes and servicing the request. The virtual attribute service module 122 may generate or determine the values of a virtual attribute or obtain them from a plugin or by a similar mechanism.

In one embodiment, the LDAP server 108 may include an access control subsystem module 124. The access control subsystem module 124 manages and controls access to entries and virtual attributes by users of the LDAP server 108. Each entry or attribute may have a set of access control instructions (ACIs) that indicate which users are to have permission to access or modify an entry or attribute. A set, as used herein, may refer to any number of items including one item. The access control subsystem reads the ACIs and allows or denies access to an entry or attribute based on the user, type of request, the applicable ACIs and similar factors.

Figure 2:
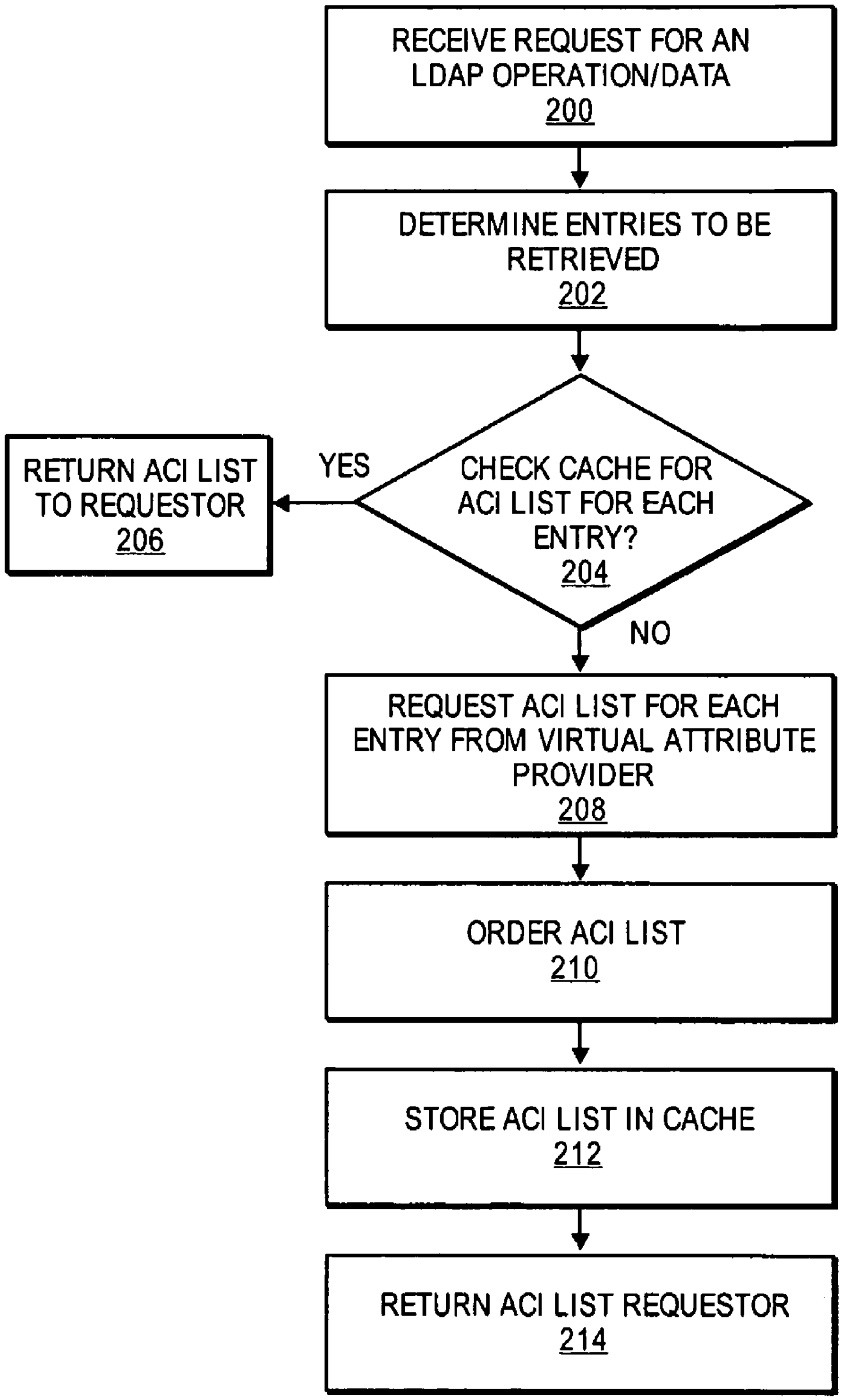
FIG. 2 is a flowchart of one embodiment of a process for applying access control instructions (ACIs) to an LDAP entry access request.

FIG. 2 is a flowchart of one embodiment of a process for applying access control instructions (ACIs) to an entry access request. The method may be performed by processing logic that may comprise hardware (e.g., circuitry, dedicated logic, programmable logic, microcode, etc.), software (such as instructions running on a processing device) or a combination thereof. In one embodiment, method is performed by the LDAP directory server 108 of FIG. 1.

Referring to FIG. 2, the method begins with processing logic receiving a request pertaining to data in an LDAP repository (block 200). The request may be received from a client, application server or similar entity and may be in the form of a request for a specific entry or attribute that may be retrieved from the LDAP repository and returned to the requesting client. In other cases the request will be in the form of a search or filter or similar LDAP operation. For example, a request may be for the email address of a specific employee. This request may be represented as a query or search for a particular user in the form of search filter including a logical expression and set of search terms or similar expression. The search filter may be applied to generate a candidate list of data items that meet the requirements of the search filter (block 202). The candidate list may include a list of entries in the LDAP repository that have attributes and attribute values that meet the filter requirements. In the example, a single user entry may be identified and retrieved. In the process of retrieving the single user entry the LDAP server checks to ensure that the requester has the proper permission to access the entry. The LDAP server utilizes the access control subsystem to make this determination. The access control subsystem determines each the ACIs that apply to the entry to be retrieved and checks that the requester meets the requirements of each ACI.

In one embodiment, the LDAP server checks a cache to determine if an attribute representing the ACIs or ACI list that apply to each LDAP entry or attribute to be retrieved are present (block 204). The attributes representing the ACIs or ACI list may be organized as a set of data items within the access control cache. The access control attribute may be a non-virtual attribute that may be cached in a special purpose or general purpose cache (e.g., an access control cache). In another embodiment, the ACIs applicable to an LDAP entry or attribute may be represented as a virtual attribute. The virtual attribute may be stored in a specialized virtual attribute cache. The virtual attribute cache may store any type of virtual attribute or may be further specialized to store virtual attributes representing ACIs or ACI lists. In one embodiment, the cache for storing access control attributes may be a temporary storage device such as random access memory (RAM) device or similar device. In another embodiment, the access control cache may be stored or backed up to a persistent storage device or may be periodically stored or backed up to the persistent storage device such as a fixed disk or similar persistent storage device. The persistent cache can be retrieved at system start up or restart.

If the ACIs or ACI list for an LDAP entry or attribute is not present in the access control cache then the request may be forwarded to a virtual attribute service provider or similar program or module to retrieve or determine the applicable ACIs or ACI list (block 208). In another embodiment, the LDAP server may handle this process. The ACIs may be retrieved by traversing the LDAP directory, which has a tree structure. The virtual attribute provider or LDAP server may traverse each entry starting with the entry to be retrieved and progressing through each parent entry to find those ACIs that apply to the requested entry. These ACIs may then be compiled, for example as an ACI list and presented as an attribute, virtual attribute or similar data structure.

After the list has been compiled, the order of the entries may be adjusted to optimize the use of the list (block 210). For example, ACIs that deny access to an LDAP entry or attribute, ‘denial ACIs,’ may be ordered before ACIs that allow access. The order of the ACIs in the list determines the order in which the instructions are evaluated each time that the associated LDAP entry or attribute is accessed. The denial ACIs are ordered in the list first because the first ACI that is evaluated and requires that the user be denied access may terminate the evaluation process. Any denial ACI that is not satisfied may block access, thus, if one ACI is evaluated and not satisfied, then all remaining ACIs that have not been evaluated do not need to be evaluated. ACIs that indicate that the access is acceptable do not override an ACI that requires denial. Thus, the evaluation of all ACIs can halt once a single denial ACI has not been satisfied. Avoiding the evaluation of subsequent ACIs decreases the processing time required and improves system efficiency. Ordering denial ACIs before acceptance ACIs increases the likelihood that all of the ACIs are not evaluated and that a larger number of ACIs are not evaluated.

The ordered ACI list may then be stored in the access control cache for use during future accesses of an associated LDAP entry or attribute (block 212). The ordered list may be stored as an attribute in an LDAP entry cache, as a virtual attribute in a specialized virtual attribute cache or similarly stored. The ACI list may then be returned to the requesting LDAP operation or to the LDAP server to be applied to the request to access the associated entry by the access control subsystem (block 214). If the ACI list is applied and allows access, then the data may be returned to the requesting client or application server. The data may be further processed by any number or combination of LDAP processes before being returned to a requesting client or application server. If the access is denied, then an indicator of the denial may be returned to the client or application server. The requested data or the indicator of the failed access may be sent to the requesting client or application server over a network or by similar communication mechanism.

Figure 3:
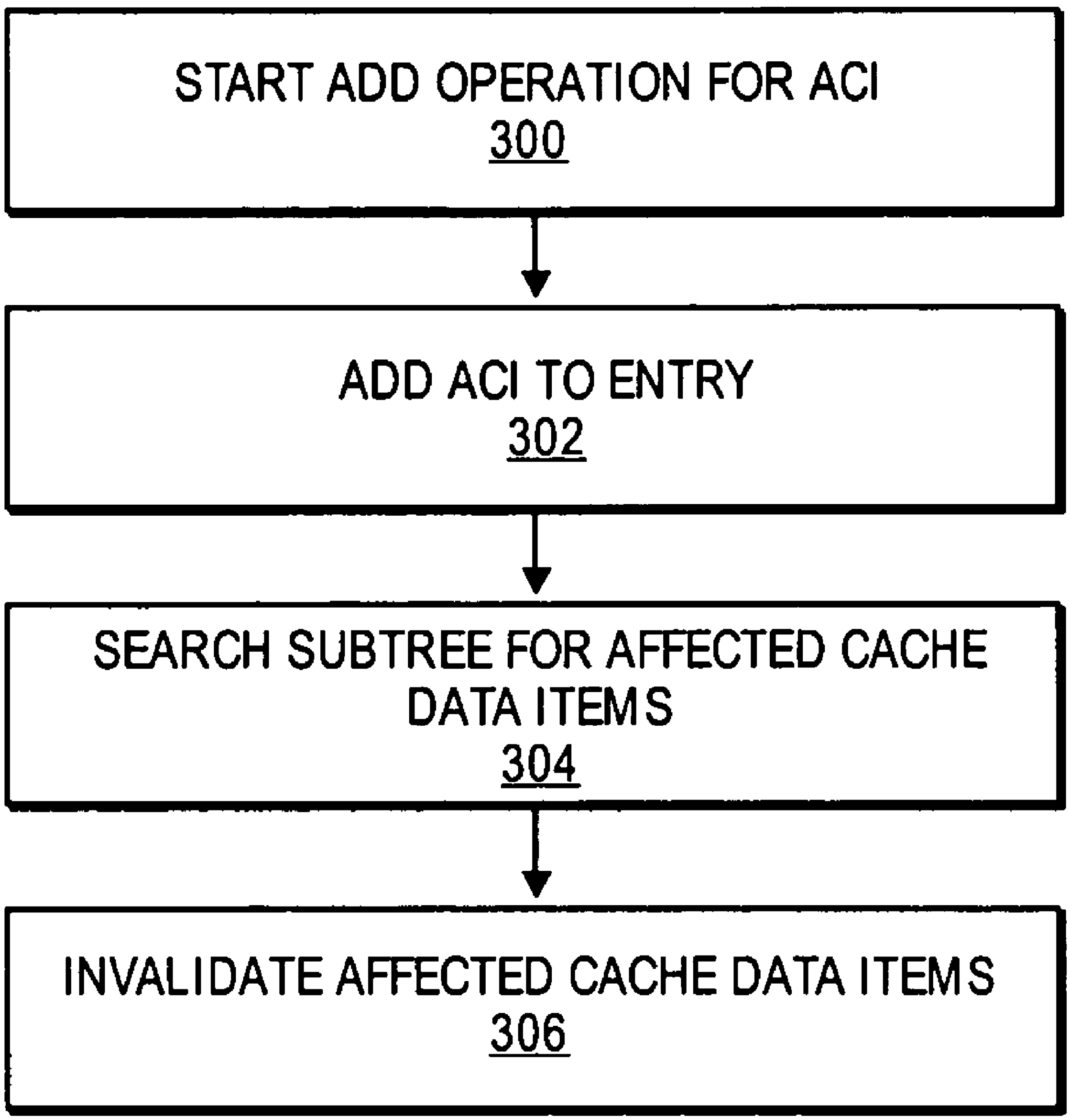
FIG. 3 is a flowchart of one embodiment of a process for servicing an ACI add operation.

FIG. 3 is a flowchart of one embodiment of a process for servicing an ACI add operation. An ACI add operation may be initiated by a client, application server or administrator of the LDAP server or intermediate processes and applications to update an ACI list for an entry or set of entries. The process may be initiated by a client, application server, administrator, program, module or similar LDAP entity starting an add operation to add a new ACI to an LDAP entry or set of entries (block 300). The add operation may be utilized just to add new entries or may be used in combination with other operations such as delete operations to modify ACIs by deleting and replacing them. The add operation inserts the new ACI into the LDAP entry in the LDAP repository using database and LDAP operations for repository management (block

302). In one embodiment, the new ACI is added as a value of an ACI attribute of the LDAP entry.

A search may then be carried out to determine each child entry of the LDAP entry with the added ACI attribute that is affected by the addition of the ACI (block 304). The affected child LDAP entries may found by traversing the subtree of the affected LDAP entry in the LDAP directory (block 304). Each child LDAP entry may be affected by the newly added ACI. Whether a child LDAP entry is affected may be dependent on the type of the characteristics of the added ACI. For example, an ACI that includes an LDAP filter to target entries may affect only child LDAP entries that meet the filter requirements.

In one embodiment, the access control cache may be searched to find all data items that correspond to child LDAP entries in the LDAP directory. Each of these data items may then be invalidated in the access control cache (block 306). The subtree of the LDAP entry with the added ACI may be traversed and each of the entries may be compared against the data items in the access control cache to find matches. Matching entries may be invalidated. In another embodiment, those data items that match a child LDAP entry in the subtree of the LDAP entry with the added ACI may be modified to include the added ACI. The data item in the access control cache may be modified to reflect the added ACI. In this embodiment, the data items in the access control cache are not invalidated, rather they are maintained to match the changes to the corresponding LDAP entries.

Figure 4:
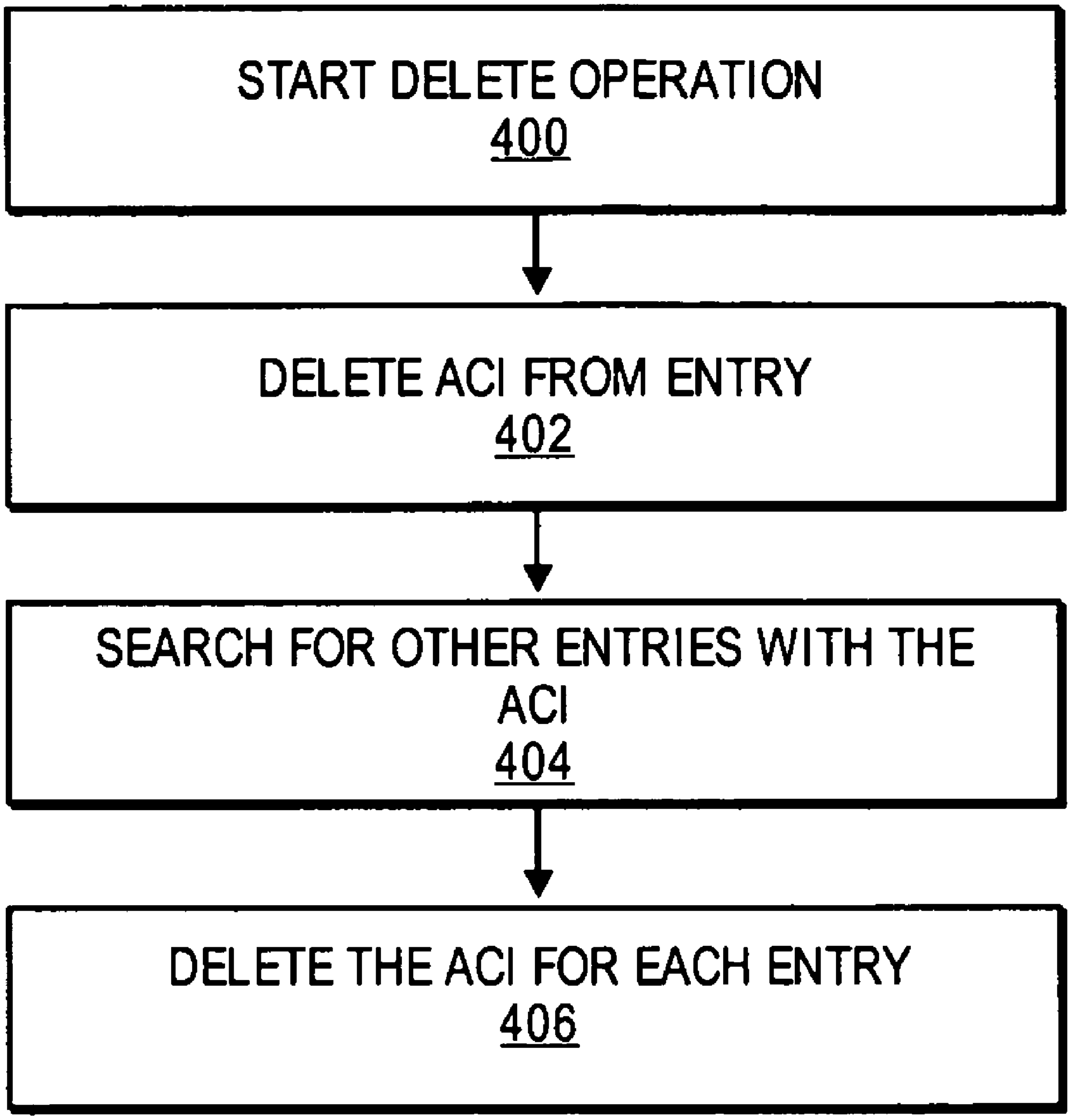
FIG. 4 is a flowchart of one embodiment of a process for servicing an ACI delete operation.

FIG. 4 is a flowchart of one embodiment of a process for servicing an ACI delete operation. An ACI delete operation may be initiated by a client, application server or administrator of the LDAP server or intermediate processes and applications to update an ACI list for an entry or set of entries. The process may be initiated by a client, application server, administrator, program, module or similar LDAP entity starting a delete operation to remove an ACI of an entry (block 400). The delete operation may be utilized just to delete a specific entry or set of entries or may be used in combination with other operations such as add operations to modify ACIs by deleting and replacing them. The delete operation removes an existing ACI from an entry in the LDAP repository using standard database and LDAP operations for repository management (block 402).

A search may then be carried out to determine each child LDAP entry in the subtree of the LDAP entry with the deleted ACI (block 404). In one embodiment, the subtree may be traversed and each LDAP entry may be compared against the data items in the access control cache. Each of the matching data items may be invalidated. In another embodiment, matching entries may be analyzed to determine if the deleted ACI is present in the data item. The ACI deleted from the LDAP entry may be deleted from each of the child LDAP entries in the subtree. In one embodiment, the deleted ACI may be deleted from the attribute or virtual attribute representing the ACI list for each entry effected.

Figure 5:
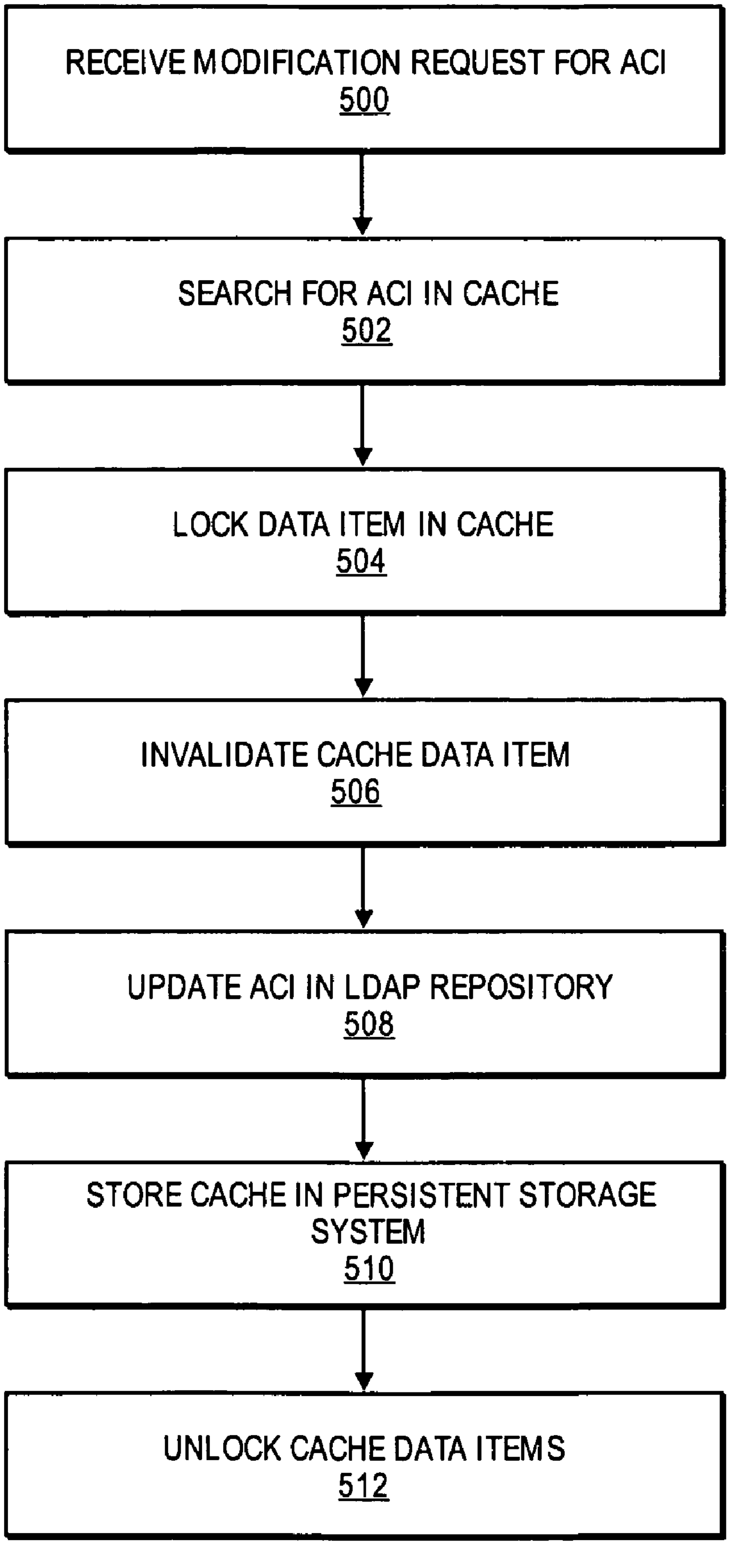
FIG. 5 is a flowchart of one embodiment of a process for servicing an ACI modification request.

FIG. 5 is a flowchart of one embodiment of a process for servicing an ACI modification request. A modification request may be any type of request such as an add or delete request affecting an ACI. The modification is handled to maintain the coherency of the LDAP service by ensuring that the access control cache data items related to the modified ACI are not accessed during the modification or inconsistent with the modified ACI. The process may be initiated with the reception of a request for a modification of an ACI (block 500).

The access control cache containing representations of ACIs and ACI lists for LDAP entries may be searched to find each data item corresponding to an LDAP entry reliant on the ACI to be modified (block 502). The search of the access control cache may be any type of standard cache search, comparison or similar mechanism for determining the presence of an ACI in a access control cache data item. Each access control cache data item may be compared against entries in the LDAP directory that may have a relationship with the data item including corresponding LDAP entries, the parent or child of the LDAP entry or similar LDAP entries. Each data item found to have a match with the ACI to be modified may be locked to prevent access of these data items in the access control cache during the modification process (block 504). Any type of mutual exclusion algorithm or mechanism may be utilized to prevent access to these entries including semaphores, locks and similar mechanism and algorithms.

In one embodiment, each of the locked data items in the access control cache may be invalidated (block 506). The data items may be invalidated to ensure that they are updated to reflect the modification to the associated ACIs for each entry. The next time that the LDAP entry corresponding to the invalidated data item is requested, the ACI list for the LDAP entry will not be present in the access control cache and will be recalculated or determined. The ACI list will then reflect the modification and be stored in the access control cache. In another embodiment, each data item in the access control cache may be modified to be consistent with the modification request received, that is the access control cache data items affected by the modification are each modified to match the change to the ACI list of the corresponding LDAP entry. The data items in the access control cache are modified to match the ACI list for the LDAP entry in the LDAP repository.

The ACI modification may be implemented in the LDAP repository after the corresponding access control cache data items are locked (block 508). The modification to the LDAP repository may be implemented before, after or in parallel to the invalidation or modification of the locked access control cache data items. The modification to the LDAP repository may be carried out or implemented by any ACI modification operation, such as an add operation, delete operation or a combination of ACI operations.

In one embodiment, where a persistent store or backup system is present, the access control cache may be updated or stored to bring the persistent store or backup system into agreement with the current state of the access control cache (block 510). This ensures that if the system is restarted, then the state of the access control cache and the data items in the access control cache may be loaded and consistent with the LDAP repository and the ACI data retrieved from the access control cache is accurate and up to date. In another embodiment, a persistent store or backup system may not be present and the update may not be undertaken.

After the modification has been completed the locked access control cache data items may be unlocked (block 512). The unlocking of the access control cache data items may utilize the appropriate mutual exclusion mechanism or algorithm such as a semaphore, lock or similar mechanism or algorithm. In another embodiment, the access control cache data items may be unlocked after being invalidated. The access control cache data items are not modified and may be unlocked as soon as they are invalidated. Consistency with the LDAP entry is no longer at issue if the access control cache data items are invalidated and the access control cache data items may be unlocked after invalidations to be replaced based on the cache replacement mechanism of the cache.

Figure 6:
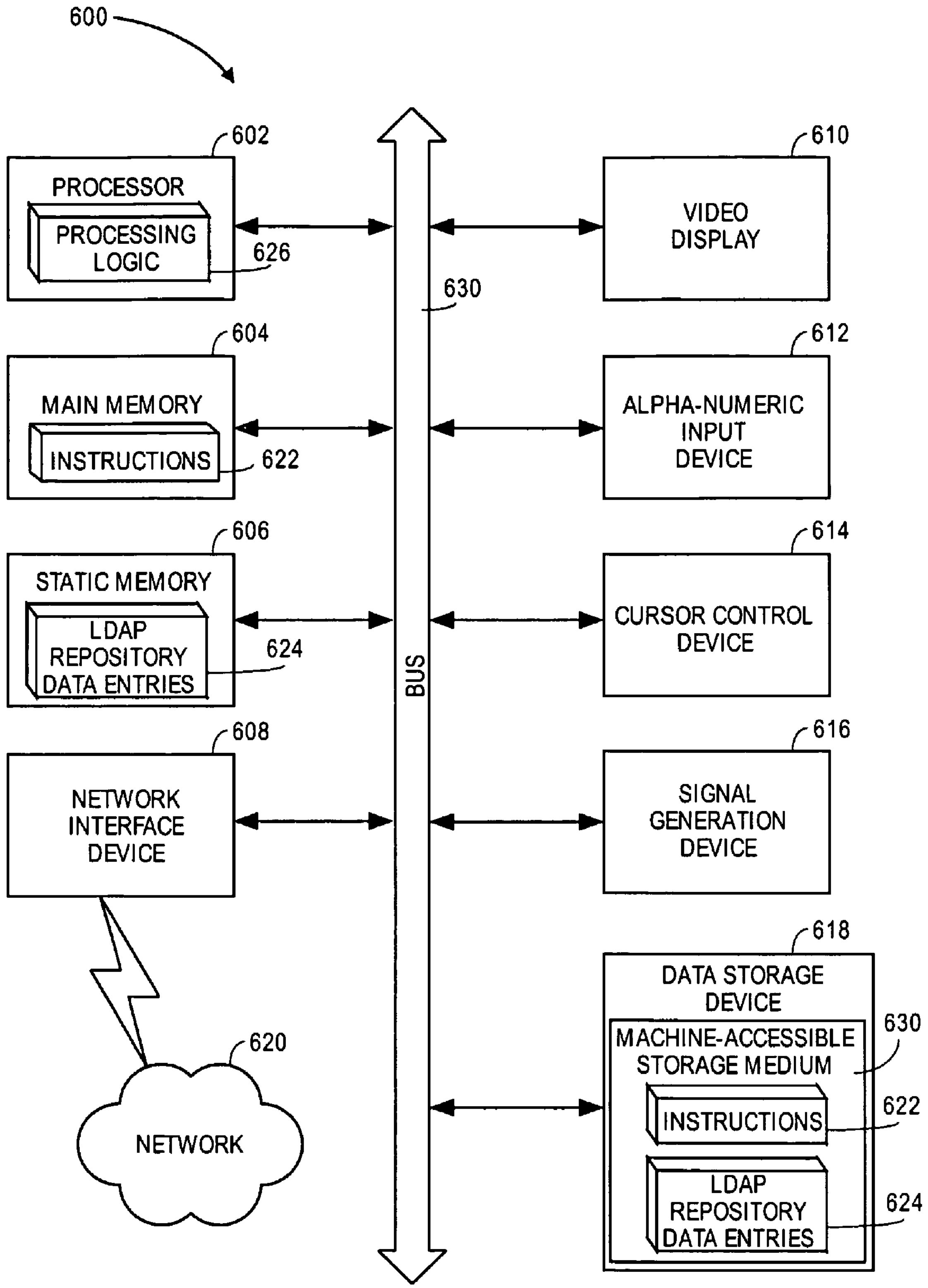
FIG. 6 is a diagram of one embodiment of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet or the Internet. The machine may operate in the capacity of a server or a client machine in client-server network environment or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 may represent one or more general-purpose processing devices such as a microprocessor, central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 630 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-accessible storage media. The software 622 may further be transmitted or received over a network 620 via the network interface device 608.

The machine-accessible storage medium 630 may also be used to store LDAP repository data entries 624. LDAP repository data entries 624 may also be stored in other sections of computer system 600, such as static memory 506.

While the machine-accessible storage medium 630 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, and optical and magnetic media.

Thus, a method and apparatus for maintaining an entry based access control system. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:

maintaining, by a lightweight directory access protocol (LDAP) server, a cache storing a plurality of attributes in association with respective LDAP entries, the plurality of attributes representing access control instructions (ACIs) applicable to corresponding LDAP entries;

receiving a first request pertaining to a first LDAP entry;

determining that the cache does not store ACIs applicable to the first LDAP entry;

obtaining a list of ACIs that apply to the first LDAP entry, wherein the obtaining comprises traversing an LDAP repository tree to determine which ACIs are applicable to the first LDAP entry;

controlling access to the first LDAP entry by a requester using the ACI list;

storing the ACI list in the cache of the LDAP server in association with the first LDAP entry; and when processing a second request pertaining to the first LDAP entry, controlling access to the first LDAP entry by a requester using the ACI list in the cache without traversing the LDAP repository tree.

2. The method of claim 1, further comprising:

ordering the list of ACIs to place denial instructions toward the top of the list.

3. The method of claim 1, further comprising:

receiving a request for the list; and returning the list to a requester.

4. The method of claim 1, further comprising:

detecting a modification to an access control instruction of the entry; and invalidating the entry in response to the modification.

5. The method of claim 1, further comprising:

ordering the list of LDAP ACIs to place allow instructions toward the bottom of the list.

6. The method of claim 1, further comprising:

searching for an LDAP ACI in the entry cache.

7. The method of claim 1, wherein the list is stored as a value of a virtual attribute.

8. The method of claim 1, wherein the list is stored in an LDAP entry cache.

9. The method of claim 1, wherein the list is stored in a virtual attribute cache.

10. The method of claim 1, wherein the list includes all LDAP ACIs relevant to an entry.

11. The method of claim 1, further comprising:

retrieving the LDAP ACIs for the LDAP entry from the cache; and restricting access to data based on the application of the LDAP ACIs.

12. An apparatus comprising:

a memory, hosting a cache that stores a plurality of attributes in association with respective lightweight directory access protocol (LDAP) entries, the plurality of attributes representing access control instructions (ACIs) applicable to corresponding LDAP entries; and a processor, coupled to the memory, to receive a first request pertaining to an LDAP entry, to determine that the cache does not store ACIs applicable to the LDAP entry, to obtain a list of CIs that apply to the LDAP entry, wherein the obtaining comprises traversing an LDAP repository tree to determine which ACIs are applicable to the entry, to control access to the LDAP entry by a requester using the ACI list, to store the ACI list in the cache in association with the LDAP entry, to receive a second request pertaining to the LDAP entry, and to control access to the LDAP entry by a requester using the ACI list in the cache without traversing the LDAP repository tree.

13. The apparatus of claim 12, further comprising:

an virtual attribute provider to generate the list in response to a request from the processor.

14. The apparatus of claim 12, further comprising:

an access control module to evaluate access control instructions.

15. The apparatus of claim 12, wherein the cache further comprises:

an entry cache to store LDAP entries; and a virtual attribute cache to store the list.

16. An article of manufacture, comprising:

a non-transitory machine-accessible storage medium including data that, when accessed by a machine, cause the machine to perform a method comprising:

maintaining, by an lightweight directory access protocol (LDAP) server, a cache storing a plurality of attributes in association with respective LDAP entries, the plurality of attributes representing access control instructions (ACIs) applicable to corresponding LDAP entries;

receiving a first request pertaining to a first LDAP entry;

determining that the cache does not store ACIs applicable to the first LDAP entry;

obtaining a list of ACIs that apply to the first LDAP entry, wherein the obtaining comprises traversing an LDAP repository tree to determine which ACIs are applicable to the first LDAP entry;

controlling access to the first LDAP entry by a requester using the ACI list;

storing the ACI list in the cache of the LDAP server in association with the first LDAP entry; and when processing a second request pertaining to the first LDAP entry, controlling access to the first LDAP entry by a requester using the ACI list in the cache without traversing the LDAP repository tree.

17. The article of manufacture of claim 16, wherein the method further comprises:

ordering the list of ACIs to place denial instructions toward the top of the list.

18. The article of manufacture of claim 16, wherein the method further comprises:

receiving a request for the list; and returning the list to a requester.

19. The article of manufacture of claim 16, wherein the method further comprises:

detecting a modification to an access control instruction of the entry; and invalidating the entry in response to the modification.

20. The article of manufacture of claim 16, wherein the method further comprises:

ordering the list of LDAP ACIs to place allow instructions toward the bottom of the list.

21. The article of manufacture of claim 16, wherein the method further comprises:

searching for an LDAP ACI in the entry cache.

22. The article of manufacture of claim 16, wherein the method further comprises:

retrieving the LDAP ACIs for the LDAP entry from the cache; and restricting access to data based on the application of the LDAP ACIs.

* * * * *